United States Patent [19]

Cobbledick et al.

[11] Patent Number: 4,534,888

[45] Date of Patent: Aug. 13, 1985

[54] IN-MOLD COATING

[75] Inventors: David S. Cobbledick, Kent; Donald F. Reichenbach, Massillon; Henry Shanoski, Akron, all of Ohio

[73] Assignee: The General Tire & Rubber Company, Akron, Ohio

[21] Appl. No.: 514,415

[22] Filed: Jul. 18, 1983

Related U.S. Application Data

[60] Division of Ser. No. 435,026, Oct. 25, 1982, Pat. No. 4,414,173, and a continuation-in-part of Ser. No. 316,592, Nov. 2, 1981, abandoned.

[51] Int. Cl.$^3$ .............................................. H01B 1/06
[52] U.S. Cl. .................................................... 252/511
[58] Field of Search ............... 252/511, 506; 524/495, 524/496; 427/133; 264/257, 255, 259; 428/413, 482, 423–427

[56] References Cited

U.S. PATENT DOCUMENTS 4,081,578  3/1978  Van Essen et al. .................... 428/63
4,242,415  12/1980  Feltzin et al. ....................... 525/440

FOREIGN PATENT DOCUMENTS 39588  11/1981  European Pat. Off. .

Primary Examiner—Josephine L. Barr

[57] ABSTRACT

An FRP molding can be in-mold coated using a free radical peroxide initiated thermosetting composition of at least one polymerizable epoxy based oligomer having at least two acrylate groups, at least one copolymerizable ethylenically unsaturated monomer, at least one copolymerizable monoethylenically unsaturated compound having a —CO— group and a —NH$_2$, —NH— and/or —OH group, polyvinyl acetate, at least one zinc salt of a fatty acid having at least 10 carbon atoms, at least one accelerator for a peroxide initiator, conductive carbon black, a filler such as talc and a copolymerizable or cocurable compound selected from the group consisting of (I) at least one polyoxyalkylene glycol oligomer having two acrylate groups and
(II) at least one polyurethane oligomer having two acrylate groups and mixtures of (I) and (II).

Optionally and desirably, there additionally can be added to the foregoing composition at least one calcium salt of a fatty acid.

9 Claims, No Drawings

IN-MOLD COATING

This is a division of application Ser. No. 435,026 filed Oct. 25, 1982 now U.S. Pat. No. 4,414,173, which is a continuation-in-part of prior copending U.S. patent application Ser. No. 316,592 filed Nov. 2, 1981, now abandoned.

This invention relates to a thermosetting in-mold coating composition useful for in-mold coating a molded fiberglass reinforced thermoset plastic such as a polyester resin or a vinyl ester resin (FRP) molding or part that usually does not require the combining of two or more components immediately prior to use.

BACKGROUND OF THE INVENTION

A major deficiency of compression molded thermoset glass fiber reinforced polyester (FRP) moldings is surface imperfections such as pits, pores, surface cracks, waviness and sink marks. The in-mold coating process of U.S. Pat. No. 4,081,578 generally overcomes these imperfections by molding a low viscosity thermoset on top of the FRP in a second molding operation. The composition described in U.S. Pat. No. 4,081,578 contains free hydroxyl as well as isocyanate groups that co-react at room temperature, resulting in a limited (about one-half hour) pot life. In practice, the reactive ingredients are kept apart, and combined only immediately prior to application. This necessitates dual pumping equipment and an accurate metering device, which increase the cost and complexity of the system. A single component coating would thus offer a significant advantage. Moreover, conductive carbon black does not dispense well in isocyanate based in-mold coating compositions, and it is difficult to obtain after in-mold coating and subsequent electrostatic painting, a paint layer which is even.

Therefore, it is an object of this invention to avoid the difficulties alluded to and to provide a process for in-mold coating an FRP molding with a one-component coating composition.

Another object of this invention is to provide a composition suitable for in-mold coating an FRP molding.

A further object of this invention is to provide a cured molded FRP molding or part with an adherent coating in-mold coated with a one component in-mold coating composition.

These and other objects and advantages of the present invention will become more apparent to those skilled in the art from the following detailed description and working examples.

SUMMARY OF THE INVENTION

According to the present invention a FRP molding can be in-mold coated using a one-component free radical initiated thermosetting composition of (a) 100 parts by weight of at least one polymerizable epoxy based oligomer having at least two acrylate groups and a weight average molecular weight of from about 500 to 1,500, (b) from about 80 to 160 parts by weight of at least one copolymerizable ethylenically unsaturated monomer, (c) from about 10 to 120 parts by weight of at least one copolymerizable monoethylenically unsaturated compound having a —CO— group and a —NH$_2$, —NH— and/or —OH group, (d) from about 20 to 90 parts by weight of polyvinyl acetate, (e) from about 0.2 to 5 parts by weight of at least one zinc salt of a fatty acid having at least 10 carbon atoms, (f) from about 0.01 to 1.0 part by weight of at least one accelerator for a peroxide initiator, (g) from about 5 to 30 parts by weight of conductive carbon black, (h) from about 50 to 155 parts by weight of a filler and (i) from about 5 to 120 parts by weight of a copolymerizable or cocurable diacrylate compound having a weight average molecular weight of from about 250 to 5,000 and being selected from the group consisting of
 (I) at least one polyoxyalkylene glycol based oligomer having two acrylate groups and
 (II) at least one polyurethane based oligomer having two acrylate groups and mixtures of (I) and (II).

Optionally and desirably, there additionally can be added to the foregoing composition (j) at least one calcium salt of a fatty acid having at least 10 carbon atoms in an amount of from about 0.2 to 5 parts by weight.

An organic free radical peroxide initiator is used in the composition in an amount of up to about 5%, preferably up to 2%, by weight based on the weight of the polymerizable ethylenically unsaturated materials.

The composition flows well and is stable for about a week even when containing the peroxide. It can be molded in a short period of time. The resulting thermoset coating exhibits good adhesion to different FRP substrates and will accept many paint finishes obviating the need for a primer.

Also, the carbon black disperses well throughout the composition to provide on curing an in-mold coating which can be spray painted electrostatically to provide an even paint coating or film. The present coating, moreover, thus generally eliminates any subsequent step of priming the in-mold coating with a conductive primer before electrostatic painting.

DISCUSSION OF DETAILS AND PREFERRED EMBODIMENTS

The polymerizable epoxy based oligomer having at least two acrylate (or methacrylate or ethacrylate) groups is prepared by reacting acrylic acid, methacrylic acid or ethacrylic acid and so forth with an epoxy based oligomer or resin such as a Bisphenol A epoxy, a tetrabromo Bisphenol A epoxy, phenolic novolak epoxy, tetraphenylolethane epoxy, dicycloaliphatic epoxy and so forth. Mixtures of these epoxy based oligomers may be used. Of these materials it is preferred to use a diacrylate terminated Bisphenol A epoxy oligomer. They have weight average molecular weights of from about 500 to 1,500. These materials are well known. For more information on these materials see "Heat Resistant Vinyl Ester Resin," M. B. Launikitis, Technical Bulletin, SC:116–76, Shell Chemical Company, June, 1976 and Shell Chemical Company Technical Bulletins SC:16–76 and SC:60–78.

A copolymerizable ethylenically unsaturated monomer is used to copolymerize with and to crosslink the polymerizable oligomers and includes styrene (preferred), alpha methyl styrene, vinyl toluene, t-butyl styrene, chlorostyrene, methyl methacrylate, diallyl phthalate (with styrene or methyl methacrylate and the like), triallyl cyanurate, triallyl isocyanurate, divinyl benzene, methyl acrylate and so forth and mixtures thereof. The unsaturated monomer is used in an amount of from about 80 to 160 parts by weight per 100 parts by weight of the polymerizable epoxy based oligomer.

For further copolymerization and crosslinking and to improve hardness of the resulting coating there is used in the in-mold coating composition a monoethylenically unsaturated compound having a

group and having a —NH$_2$, —NH— and/or —OH group. Examples of such monomeric compounds are hydroxyl propyl methacrylate (preferred), hydroxyethyl methacrylate, hydroxy ethyl acrylate, hydroxy ethyl crotonate, hydroxypropyl acrylate, hydroxy polyoxypropylene acrylate, hydroxy polyoxypropylene methacrylate, hydroxy polyoxyethylene methacrylate, acrylamide, methacrylamide, N-hydroxymethyl acrylamide, N-hydroxymethyl methacrylamide and so forth and mixtures of the same. These compounds are used in an amount of from about 10 to 120 parts by weight per 100 parts by weight of the polymerizable epoxy based oligomer.

Polyvinyl acetate is employed in the in-mold composition to improve paint adhesion of the in-mold coating to the substrate. The polyvinyl acetate is employed in a minor amount by weight as compared to the total weight of the ethylenically unsaturated materials in the in-mold coating composition and sufficient for paint adhesion. The polyvinyl acetate is employed in an amount of from about 20 to 90 parts by weight per 100 parts by weight of the epoxy based polymerizable oligomer.

A zinc salt of a fatty acid having at least 10 carbon atoms, also, is employed in the in-mold coating composition and appears to function as a mold release agent and as a secondary accelerator for the cure. Fatty acids are well known. See "Organic Chemistry," Fieser and Fieser, D. C. Heath and Company, Boston, 1944, pages 88, 381–390, 398 and 401 and "Hackh's Chemical Dictionary," Grant, McGraw Hill Book Company, New York, 1969, page 261. Mixtures of zinc salts of the fatty acids can be used. Examples of some zinc salts are zinc palmitate, zinc stearate, zinc ricinoleate and the like. It is preferred to use the zinc salt of a saturated fatty acid such as zinc stearate. See, also, "Whittington's Dictionary Of Plastics," Whittington, Technomic Publishing Co., Inc., Stamford, Conn., 1968, pages 35, 102 and 261. The zinc salt is used in an amount from about 0.2 to 5 parts by weight per 100 parts by weight of the polymerizable epoxy based oligomer.

An accelerator is used for the peroxide initiator and is a material such as a drier, e.g., cobalt octoate (preferred). Other materials which may be used are zinc naphthenate, lead naphthenate, cobalt naphthenate and manganese naphthenate. Soluble Co, Mn and Pb salts of linoleic acid, also, may be used. Mixtures of accelerators may be used. The accelerator is used in an amount of from about 0.01 to 1 part by weight per 100 parts by weight of the polymerizable epoxy based oligomer.

Conductive carbon black is used in the in-mold coating composition in an amount of from about 5 to 30 parts by weight per 100 parts by weight of the polymerizable epoxy based oligomer.

A filler is used in the in-mold coating composition in an amount of from about 50 to 155 parts by weight per 100 parts by weight of the polymerizable epoxy based oligomer. Examples of fillers are clay, MgO, Mg(OH)$_2$, CaCO$_3$, silica, calcium silicate, mica, aluminum hydroxide, barium sulfate, talc, hydrated silica, magnesium carbonate and mixtures of the same. The fillers should be finely divided. Of these fillers it is preferred to use talc. Fillers can afford the desired viscosity and flow to the in-mold composition for molding and contribute to the desired physical properties in the resulting thermoset in-mold coating. Fillers, also, may improve adhesion. However, care should be exercised in the use of high filler contents as this may give high viscosities and result in flow and handling difficulties.

There further is employed in the in-mold coating composition a copolymerizable or cocurable diacrylate compound having a weight average molecular weight of from about 250 to 5,000, in an amount of from about 5 to 120 parts by weight per 100 parts by weight of the polymerizable epoxy based oligomer, and being selected from the group consisting of (I) at least one polyoxyalkylene glycol based oligomer having two acrylate groups and (II) at least one polyurethane based oligomer having two acrylate groups and mixtures of (I) and (II).

Examples of said diacrylate compounds (I) include triethylene glycol diacrylate, tetraethylene glycol diacrylate, tetraethylene glycol dimethacrylate, polyethylene glycol diacrylate, polypropylene glycol diacrylate, polyethylene glycol dimethacrylate or polyoxyethylene glycol dimethacrylate (preferred), polypropylene glycol dimethacrylate, polyethylene propylene glycol diacrylate, and so forth and mixtures thereof. These acrylates are made by reacting polyoxyalkylene glycols such as polypropylene ether glycol with acrylic acid, methacrylic acid and the like. Since some of these reactive difunctional materials may be made by reacting unsaturated acids and alcohols, they may contain some OH and/or COOH groups.

Examples of said diacrylate compounds (II) for use in said in-mold coating composition include a polyesterurethane diacrylate, a polyetherurethane diacrylate or a polyesteretherurethane diacrylate or other polyurethane oligomer having two acrylate groups. These materials may be made by reacting a polyetherdiol (e.g., a polypropylene ether diol), polyesterdiol (e.g., a polyethylene adipate diol) and/or a polyetherester diol (e.g., a polypropylene ether adipate diol), and so forth with a diisocyanate like tolyene diisocyanate, 4,4'-diphenylmethane diisocyanate, hexamethylene diisocyanate and the like in an amount sufficient to form a diisocyanate terminated polyurethane prepolymer which is then reacted with hydroxy propyl acrylate, hydroxy ethyl acrylate, hydroxy ethyl methacrylate and so forth to form the diacrylate terminated polyurethane oligomer or polymer. Mixtures of these acrylate terminated polyurethane oligomers may be used. The term "acrylate" as used here is intended to cover methacrylate and ethacrylates as well as acrylates. Of these materials it is preferred to use a diacrylate polyesterurethane oligomer. Acrylate terminated polyurethane oligomers, e.g., curable by light, ultraviolet, electric beam and/or infrared and so forth, are well known, and sometimes are referred to as irradiation or radiation curable materials.

The diacrylate compounds (I) and/or (II), above, appear to improve the hardness of and reduce the brittleness of the in-mold coating.

Optionally and desirably also a calcium salt of a fatty acid having at least 10 carbon atoms, from about 0.2 to 5 parts by weight of calcium salt per 100 parts by weight of the polymerizable epoxy based oligomer, can be used in the in-mold coating composition as a mold release agent and to control the rate of the cure. Fatty acids are well known, see above. Mixtures of calcium salts of the fatty acids can be used. Examples of some calcium salts are calcium stearate, calcium palmitate, calcium oleate and the like. It is preferred to use the calcium salt of a saturated fatty acid like calcium stearate.

An organic free-radical or free radical generating initiator (catalyst) such as a peroxide is used to catalyze the polymerization, copolymerization and/or crosslinking of the ethylenically unsaturated oligomers and the other ethylenically unsaturated materials. Examples of free-radical initiators include tertiary butyl perbenzoate, tertiary butyl peroctoate in diallyl phthalate, diacetyl peroxide in dimethyl phthalate, dibenzoyl peroxide, di(p-chlorobenzoyl) peroxide in dibutyl phthalate, di(2,4-dichlorobenzoyl) peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumyl hydroperoxide, diacetyl peroxide, t-butyl hydroperoxide, ditertiary butyl peroxide, 3,5-dihydroxy-3,5-dimethyl-1,2-oxacyclopentane, and 1,1-bis(t-butyl peroxy)-3,3,5-trimethyl cyclohexane and the like and mixtures thereof. It is desirable sometimes to use mixtures of initiators to take advantage of their different decomposition rates and times at different temperatures and so forth. A preferred initiator to use is tertiary butyl perbenzoate. The peroxide initiator should be used in an amount sufficient to overcome the effect of the inhibitor and to cause crosslinking or curing of the ethylenically unsaturated materials. In general the peroxide initiator is used in an amount of up to about 5%, preferably up to about 2%, by weight based on the weight of the ethylenically unsaturated materials employed in the in-mold coating composition.

The unsaturated materials mentioned above, thus, are used in an amount sufficient to provide on cure (e.g., polymerization, copolymerization and/or crosslinking) a thermoset composition.

To prevent premature gelation of the ethylenically unsaturated materials and to provide for improved shelf-life or storageability inhibitors are added in the desired amount to the composition or are provided in the raw materials before use. Examples of inhibitors are hydroquinone, benzoquinone, p-t-butyl catechol and the like and mixture thereof.

The in-mold composition additionally optionally may be compounded with other mold release agents, antidegradants, U-V absorbers, paraffin wax, solid glass or resin micro-spheres, thickening agents, low shrink additives and the like. These compounding ingredients should be used in amounts sufficient to provide satisfactory results. It is not desirable to use in the in-mold composition of this invention materials like butadiene-styrene block copolymers or fatty alcohol phosphates.

For ease in handling, materials like polyvinylacetate may be dissolved in a reactive monomer like styrene. The viscosity of the oligomers may be reduced by dilution with styrene and the like. The ingredients of the in-mold composition should be readily mixed and handled at ambient or room temperature or temperatures below the polymerization temperature so that they may be readily pumped to the mold and injected into the same. The ingredients may be warmed or heated before or during mixing and mixed in steps to facilitate thorough mixing, dispersion and solution of the same. Also, the bulk of the ingredients can be thoroughly mixed and the remainder including the catalyst separately mixed and then both can be pumped to a mixing bead to be mixed together and then injected into the mold.

With the peroxide initiator or catalyst the in-mold composition exhibits a shelf-life at room temperature (about 25° C.) of about a week, and without the initiator it exhibits a shelf life of several months at room temperature. The initiator is preferably added to the composition and thoroughly mixed therewith just before molding.

All of the ingredients of the in-mold coating composition should be kept dry or have a minimal amount of moisture or the water content should be controlled to obtain reproducible results and to prevent pore formation.

Mixing of the ingredients of the in-mold composition should be thorough. Injection or compression, transfer molding, or other molding apparatus or machines can be used for the in-mold coating. Molding apparatus and methods may be found in U.S. Pat. Nos. 4,076,780; 4,076,788; 4,081,578; 4,082,486; 4,189,517; 4,222,929; 2,245,006; 4,239,796; 4,239,808 and 4,331,735. Please see, also, "Proceedings of the Thirty-Second Annual Conference Reinforced Plastics/Composites Institute," SPI, Washington, February 1977, Griffith et al, Section 2-C, pages 1–3 and "33rd Annual Technical Conference, 1978 Reinforced Plastics/Composites Institute The Society of the Plastics Industry, Inc.," SPI, Ongena, Section 14-B, pages 1–7. The in-mold coating composition can be applied to the substrate and cured at a temperature of from about 290° to 310° F., and at a pressure of about 1000 p.s.i. for from about 0.5 to 3 minutes.

The processes and products of the present invention can be used in the manufacture of automobile parts such as grille and headlamp assemblies, deck hoods, fenders, door panels and roofs as well as in the manufacture of food trays, appliance and electrical components, furniture, machine covers and guards, bathroom components, structural panels and so forth. The glass fiber reinforced thermoset plastic (FRP) such as the polyester resin or vinyl ester resin and glass fiber composition substrate to which the in-mold composition is applied can be a sheet molding compound (SMC) or a bulk molding compound (BMC), or other thermosetting FRP material as well as a high strength molding compound (HMC) or a thick molding compound. The FRP substrate can have from about 10 to 75% by weight of glass fibers. The SMC compound usually contains from about 25 to 30% by weight of glass fibers while the HMC compound may contain from about 55 to 60% by weight of glass fibers. The glass fiber reinforced thermoset plastic (FRP) substrate can be rigid or semirigid (may contain a flexibilizing moiety such as an adipate group in the polyester). The substrate, also, may contain other flexibilizing polymers, the elastomers and plastomers, such as the styrene-butadiene block copolymers. Unsaturated polyester glass fiber thermosets are known as shown by "Modern Plastics Encyclopedia," 1975-1976, October, 1975, Vol. 52, No. 10A, McGraw-Hill, Inc., New York, pages 61, 62 and 105 to 107; "Modern Plastics Encyclopedia," 1979-1980, October, 1979, Volume 56, Number 10A, pages 55, 56, 58, 147 and 148 and "Modern Plastics Encyclopedia," 1980-81, October, 1980, Volume 57, Number 10A, pages 59, 60, and 151 to 153, McGraw-Hill, Inc., New York, N.Y. for information on vinyl ester resins see the Shell Chemical Company Technical Bulletins mentioned above.

The compositions of the present invention can exhibit good pumpability and flow in the mold. They can give rapid cures as low as 75 to 90 seconds at 300° F. They, also, show good adhesion to paints and can be used not only as an in-mold coating to cover blemishes but as a good conductive coating for electrostatic painting and as a primer for most paint finish systems such as soluble acrylic lacquers, acrylic dispersion lacquers, water borne acrylic enamels, high solids solution acrylic enamels, acrylic non-aqueous dispersions and urethanes.

The following examples will serve to illustrate the present invention with more particularity to those skilled in the art. In these examples, the parts are parts by weight unless otherwise indicated.

EXAMPLE 1

The following ingredients were mixed together to form in-mold coating compositions:

| Ingredient | Parts by Weight | | | | |
|---|---|---|---|---|---|
| | A | B | C | D | E |
| LP 90 | 150 | 150 | 150 | 150 | 225 |
| UVITHANE 783 | 150 | 180 | 180 | 225 | 150 |
| CHEMLINK 600 | 180 | 90 | — | — | 90 |
| Hydroxypropyl methacrylate | — | 90 | — | 90 | 180 |
| Styrene | 90 | 135 | 51 | 90 | 45 |
| 2% Benzoquinone in styrene | 13.5 | 15 | 9 | 12 | 15 |

Then the following ingredients were mixed in:

| Zinc stearate | 1.62 | 1.8 | 1.08 | 1.53 | 1.89 |
|---|---|---|---|---|---|
| Cobalt octoate (12% as Co in mineral oil) | .54 | .6 | .36 | .51 | .63 |

The following ingredients were then mixed in:

| VULCAN Carbon Black | 27 | 30 | 18 | 25.5 | 31.5 |
|---|---|---|---|---|---|
| Talc (630) | 159 | 180 | 108 | 156 | 192 |

Properties of uncatalyzed compositions:

| Brookfield viscosity (cps) at 86° F., #7 spindle at 100 rpm | 8800 | 6200 | 16000 | 8400 | 7600 |
|---|---|---|---|---|---|

To each composition 1 part by weight of the initiator TBPB was added per 100 parts by weight of the total in-mold composition.

The in-mold compositions exhibited the following properties:

| Gel Time at 230° F. minutes/peak temp. °F. | 7.3/330 | 9.1/336 | 4.5/316 | 7.7/318 | 14.4/320 |
|---|---|---|---|---|---|

The above compositions were then in-mold coated onto substrates of molded thermoset conventional polyester-styrene-glass fibers compositions (about 25% glass fibers) containing in some instances additionally a butadiene-styrene block copolymer at 1,000 psi and 300° F. for about 2 minutes. The overall results obtained for the cured in-mold coating compositions are shown below:

| Hot strength (Maintenance of coating integrity on opening mold, e.g., resistance to scratching and scuffing an to delamination on opening the mold.) | Poor | Poor | Fair | Fair | Poor |
|---|---|---|---|---|---|
| Adhesion to substrate | Pass | Pass | Marginal at best | Marginal to pass | Pass |
| Phase separation (Surface continuity or appearance of coating | Yes (minor) | Yes (minor?) | Yes | None | Yes |
| Conductivity (Ransberg meter reading) | 160-165 | 165+ | 150-160 | 155 | 165+ |
| Hardness, pencil ASTM D3363-74 | Fails B | Pass HB | Pass 2H | Pass 2H | Pass HB |
| Finish Properties (Paint Acceptability) | Good | Good | Poor* | Good | Good |

*To water based acrylics. Good for acrylic lacquers.

EXAMPLE 2

The method of this example was similar to that of Example 1, above, except for the noted changes. The results obtained on in-mold coating were satisfactory.

The following ingredients were mixed together to form in-mold coating compositions:

| Ingredient | Parts By Weight | |
|---|---|---|
| | F | G |
| LP 90 | 75 | 100 |
| UVITHANE 783 | 100 | 75 |
| CHEMLINK 600 | — | 25 |
| Hydroxypropyl Methacrylate | 30 | 20 |
| Styrene | 30 | 10 |
| 2% Benzoquinone in styrene | 5 | 5 |
| Then the following ingredients were mixed in: | | |
| Zinc stearate | .675 | .675 |
| Cobalt octoate (12% as Co in mineral oil) | .225 | .225 |
| Calcium stearate | .675 | .675 |
| The following ingredients were then mixed in: | | |
| VULCAN carbon black | 11 | 11 |
| Talc | 70 | 70 |

To each composition 1 part by weight of the initiator TBPB was added per 100 parts by weight of the total in-mold composition.

The resulting in-mold compositions, F and G, passed all of the tests shown for Runs A to E of Example 1, above. However, in-mold composition F had fair hot strength properties while in-mold composition G had poor hot strength properties.

EXAMPLE 3

This example illustrates a method for preparation of the in-mold coating composition prior to in-mold coating and curing. The ingredients were mixed in the order as shown below:

| | |
|---|---|
| LP 90 | 100.0 pbw |
| CHEMLINK 600 | 25.0 pbw |
| Hydroxypropyl Methacrylate | 20.0 pbw |
| 2% Benzoquinone in Styrene | 5.0 pbw |

1. Charge these materials to the reactor and blend.

| | | |
|---|---|---|
| Styrene | 5.0 pbw | 6.55 pbw |
| Zinc Stearate | 0.675 pbw | |
| Calcium Stearate | 0.675 pbw | |
| Cobalt Octoate (12% as Co in mineral oil) | 0.200 pbw | |

2. Pre-blend the above materials and charge to the reactor. After adding the above charge, heat to 44° C. (110° F.) while mixing.

| | |
|---|---|
| UVITHANE 783 (Preheated to 49° C.) | 75.0 pbw |

3. Add the UVITHANE 783 to the reactor and mix until the material is uniform. Cool to 38° C. (100° F.).

| | |
|---|---|
| VULCAN carbon black | 11.0 pbw |

4. Add the carbon black to the reactor and mix for 30 minutes. Hold the temperature at 38° C. (100° F.).

| | |
|---|---|
| Talc (BEAVER WHITE 200) | 70.0 pbw |

5. Add the talc to the reactor and mix for 1 hour while holding the temperature at 38° C. (100° F.). Remove sample.
Brookfield Viscosity (cps) 86° F., #7 Spindle @ 100 rpm, 13,000–15,000.

6. Check the gel time. If below 8 minutes, add 1 pbw of 2% benzoquinone in styrene and mix for 30 minutes. Recheck the gel time. Repeat the above procedure until the gel time is between 8 to 10 minutes.

| | |
|---|---|
| Gel Time, *230° F. | 8–10 minutes |

*1.0 pbw of TBPB/100 pbw total composition. When making up material for checking the gel time, weigh out 100.0 gms total composition and add 1.00 gm of TBPB and mix thoroughly before running gel test.

7. Subtract the total number of the pbw of 2% benzoquinone in styrene additions made from the number 5 and add the difference as styrene. Mix for 30 minutes, degas for 15 minutes and filter through a 60 mesh screen. Store at 45° F. pbw—parts by weight.

EXAMPLE 4

The method of this example was similar to the preceding examples, and the following in-mold coating compositions were prepared:

| | Parts by Weight | | | |
|---|---|---|---|---|
| Ingredient | H | I | J | K |
| LP-90 | 100 | 100 | 100 | 100 |
| EPOCRYL 370 | 75 | | | |
| CHEMPOL 4825 | | 75 | | |
| UVIMER 580 | | | 75 | |
| ALTAC 382 E | | | | 75 |
| CHEMLINK 600 | 25 | 25 | 25 | 25 |
| Hydroxypropyl methacrylate | 20 | 20 | 20 | 20 |
| Styrene | 10 | 10 | 10 | 10 |
| 2% benzoquinone in styrene | 5 | 5 | 5 | 5 |
| Zinc stearate | 0.675 | 0.675 | 0.675 | 0.675 |
| Calcium stearate | 0.675 | 0.675 | 0.675 | 0.675 |
| Cobalt octoate (12% as Co in mineral oil) | 0.225 | 0.225 | 0.225 | 0.225 |
| VULCAN carbon black | 11 | 11 | 11 | 11 |
| BEAVER WHITE 200, Talc | 70 | 70 | 70 | 70 |
| Brookfeild viscosity (cps) at 86° F., #7 spindle at 100 rpm | 12,800 | 10,200 | — | — |

To each composition 1 part by weight of the initiator TBPB was added per 100 parts by weight of the total in-mold coating composition.

| | | | | |
|---|---|---|---|---|
| Gel Time at 230° F. | 5.75/314 | 8.3/324 | 15.9/322 | 8.7/323 |

In-mold coating properties on molded thermoset glass fiber-polyester-styrene substrates:

| | H | I | J | K |
|---|---|---|---|---|
| Hot Strength | Excellent | Fair | Good | — |
| Adhesion (scalpel, a severe test) to substrate | Pass | Pass | Fail | — |
| Release from mold | Good | Good | Good | Did not mold well - poor flow along with poor release |
| Phase separation | None | None | None | — |
| Conductivity (Ransberg meter reading) | 165 | 160–165 | 165 | — |

EXAMPLE 5

The method of this example was similar to the preceding examples, and the following in-mold coating compositions were prepared:

| | Parts by Weight | | | |
|---|---|---|---|---|
| Ingredient | L | M | N | O |
| LP-90 | 100 | 100 | 100 | 100 |
| UVITHANE 893 | 75 | | | |
| Polyester | | 75 | | |
| UVIMER 530 | | | 75 | |
| NUPOL 46-8012 | | | | 75 |
| CHEMLINK 600 | 25 | 25 | 25 | 25 |
| Hydroxypropyl methacrylate | 20 | 20 | 20 | 20 |
| Styrene | 10 | — | 10 | — |
| 2% benzoquinone in styrene | 5 | 5 | 5 | 5 |
| Zinc stearate | 0.675 | 0.675 | 0.675 | 0.675 |
| Calcium stearate | 0.675 | 0.675 | 0.675 | 0.675 |
| Cobalt octoate (12% as Co in mineral oil) | 0.225 | 0.225 | 0.225 | 0.225 |
| VULCAN carbon black | 11 | 11 | 11 | 11 |
| BEAVER WHITE 200, Talc | 70 | 70 | 70 | 70 |
| Brookfield viscosity (cps) at 86° F., #7 spindle at 100 rpm | 17,600 | 14,400 | — | — |

To each composition 1 part by weight of the initiator TBPB was added per 100 parts by weight of the total in-mold coating composition.

| | | | | | |
|---|---|---|---|---|---|
| Gel Time at 230° F. | 14.9/308 | 6.1/322 | 7.5/334 | 25.3/248 |

-continued reading)

In-mold coating properties on molded thermoset glass fiberpolyester-styrene substrates:

| | | | | |
|---|---|---|---|---|
| Hot Strength | Good | Fair | Good | Fair |
| Adhesion (scapel, a severe test) to substrate | Pass | Pass | Fail | — |
| Release from mold | Good | Good | Good | Did not mold well - poor cure caused sticking |
| Phase separation | None | Yes | Excessive | and poor release |
| Conductivity (Ransberg meter reading) | 165 | 165 | — | — |

Of Examples 4 and 5 Runs H, I and L were the best. Also, Run H possessed the best combination of hot strength, adhesion, mold release and conductivity. Run H, further, possessed superior hot strength as compared to Runs A, B, C, D, E, F and G of Examples 1 and 2.

EXAMPLE 6

The method of this example was similar to the preceding examples, and the following in-mold coating compositions were prepared:

| Ingredient | Parts By Weight | | | | | | |
|---|---|---|---|---|---|---|---|
| | P | Q | R | S | T | U | V |
| LP 90 | 100.0 | 100.0 | 100.0 | 50.0 | 80.0 | 50.0 | 75.0 |
| CHEMLINK 600 | 62.5 | 25.0 | 33.0 | — | — | 15.0 | 15.0 |
| Hydroxy propyl methacrylate | 60.0 | 7.5 | 30.0 | 30.0 | 30.0 | 30.0 | 30.0 |
| Styrene | — | 2.5 | — | 40.0 | 32.0 | 40.0 | 35.0 |
| 2% benzoquinone in styrene | 5.0 | 5.0 | 5.0 | 5.0 | 5.0 | 5.0 | 5.0 |
| Above mixed well and then there were added: | | | | | | | |
| Zinc stearate | 0.9 | 0.9 | 0.9 | 0.9 | 0.9 | 0.9 | 0.9 |
| Cobalt octoate (12% as Co in mineral oil) | 0.12 | 0.12 | 0.12 | 0.12 | 0.12 | 0.12 | 0.12 |
| Above mixed well and then there was added: | | | | | | | |
| EPOCRYL 370 | 62.5 | 75.0 | 67.0 | 75.0 | 75.0 | 75.0 | 85.0 |
| Above mixed well and then there were added: | | | | | | | |
| VULCAN carbon black | 11.0 | 11.0 | 11.0 | 11.0 | 11.0 | 11.0 | 11.0 |
| MISTRON RCS | 80.0 | 80.0 | 80.0 | 80.0 | 80.0 | 80.0 | 80.0 |
| Above mixed well. | | | | | | | |
| Properties of the resulting compositions: | | | | | | | |
| Brookfield viscosity (cps) at 86° F., #7 spindle @ 100 rpm | — | — | — | 24,000 | 22,600 | 21,600 | 20,400 |
| Gel time, 230° F. (1.5 pbw TBPB/100 pbw composition) | 10.9/319 | 8.5/326 | 7.8/317 | 10.7/342 | 12.5/327 | 9.7/343 | 10.5/340 |
| Properties on in-mold coating of FRP substrates with the compositions: | | | | | | | |
| Adhesion, scalpel: | | | | | | | |
| FRP I substrate | Marg./Fail | Marg./Fail(1) | Marg./Fail | Marg.(2) | Marg.(2) | Marg.(2) | Marg.(2) |
| FRP II substrate | — | — | — | Marg./Fail | Marg. | Marg./Fail | Pass |
| Hot strength* (60 seconds cure) | Poor | Good | Fair | Excellent | Excellent | Excellent | Excellent |
| Hardness, pencil* | F | F | F | H | H | H | H |

*Essentially same for coatings on both substrates
(1) Poorest adhesion
(2) Best adhesion Of Example 6, Run V possessed the best combination of hot strength and adhesion.

EXAMPLE 7

The method of this example was similar to the preceding examples, and the following in-mold coating compositions were prepared:

| Ingredient | Parts By Weight | | | | | |
|---|---|---|---|---|---|---|
| | AA | BB | CC | DD | EE | FF |
| LP 90 | 75.0 | 75.0 | 75.0 | 75.0 | 75.0 | 75.0 |
| Hydroxy propyl methacrylate | 30.0 | 30.0 | 30.0 | 30.0 | 30.0 | 30.0 |
| Styrene | 35.0 | 35.0 | 35.0 | 35.0 | 35.0 | 35.0 |
| 2% benzoquinone in styrene | 5.0 | 5.0 | 5.0 | 5.0 | 5.0 | 5.0 |
| Above mixed well and then there was added: | | | | | | |
| UVITHANE 782 | 15.0 | 30.0 | — | — | — | — |
| UVITHANE 783 | — | — | 15.0 | 30.0 | — | — |
| UVITHANE 893 | — | — | — | — | 15.0 | 30.0 |
| Above mixed well and then there were added: | | | | | | |
| Zinc stearate | 0.9 | 0.9 | 0.9 | 0.9 | 0.9 | 0.9 |

|                                                      | Parts By Weight |        |           |        |           |        |
|------------------------------------------------------|-----------------|--------|-----------|--------|-----------|--------|
| Ingredient                                           | AA              | BB     | CC        | DD     | EE        | FF     |
| Calcium stearate                                     | .45             | .45    | .45       | .45    | .45       | .45    |
| Cobalt octoate (12% as Co in mineral oil)            | .12             | .12    | .12       | .12    | .12       | .12    |
| Above mixed well and then there were added:          |                 |        |           |        |           |        |
| EPOCRYL 370                                          | 85.0            | 70.0   | 85.0      | 70.0   | 85.0      | 70.0   |
| Above mixed well and then there were added:          |                 |        |           |        |           |        |
| VULCAN carbon black                                  | 11.0            | 11.0   | 11.0      | 11.0   | 11.0      | 11.0   |
| MISTRON RCS                                          | 80.0            | 80.0   | 80.0      | 80.0   | 80.0      | 80.0   |
| Above mixed well.                                    |                 |        |           |        |           |        |
| Properties of the resulting compositions:            |                 |        |           |        |           |        |
| Brookfield vis (cps) 86° F., #7 spindle @ 100 rpm    | —               | 20,000 | —         | 15,200 | —         | —      |
| Gel Time, 230° F. (1.5 pbw TBPB/100 pbw composition) | 10.8/324        | 10.9/310 | 11.7/342 | 10.7/326 | 11.9/320 | 13.6/310 |
| Properties on in-mold coating of FRP substrates with the compositions: | | | | | | |
| Hot Strength (60 secs. cure)                         | Good            | Fair   | Excellent | Good   | Excellent | Good   |
| Adhesion, scalpel:                                   |                 |        |           |        |           |        |
| FRP I                                                | Marg./Fail      | Marg.  | Fail      | Marg.  | Marg./Fail | Marg. |
| FRP III                                              | —               | Pass   | —         | Pass   | —         | —      |
| FRP II                                               | —               | Marg.  | —         | Marg.  | —         | —      |
| Hardness, Pencil                                     | F               | F      | H         | H      | H         | H      |

Of Example 7 Run DD possessed the best combination of hot strength and adhesion.

EXAMPLE 8

The method of this example was similar to the preceding examples, and the following in-mold coating compositions were prepared:

|                                                      | Parts By Weight |        |       |            |           |
|------------------------------------------------------|-----------------|--------|-------|------------|-----------|
| Ingredient                                           | GG              | HH     | II    | JJ         | KK        |
| EPOCRYL 370                                          | 100.0           | 70.0   | 70.0  | 70.0       | 70.0      |
| LP 90                                                | —               | 75.0   | —     | —          | —         |
| UVITHANE 783                                         | —               | —      | 30.0  | —          | 15.0      |
| CHEMLINK 600                                         | —               | —      | —     | 30.0       | 15.0      |
| Hydroxy propyl methacrylate                          | 50.0            | 50.0   | 50.0  | 50.0       | 50.0      |
| Styrene                                              | 50.0            | 5.0    | 50.0  | 50.0       | 50.0      |
| 2% benzoquinone in styrene                           | 5.0             | 5.0    | 5.0   | 5.0        | 5.0       |
| Above mixed well and then there were added:          |                 |        |       |            |           |
| Zinc stearate                                        | 0.9             | 0.9    | 0.9   | 0.9        | 0.9       |
| Calcium stearate                                     | 0.45            | 0.45   | 0.45  | 0.45       | 0.45      |
| Cobalt octoate (12% as Co in mineral oil)            | 0.12            | 0.12   | 0.12  | 0.12       | 0.12      |
| Above mixed well and then there were added:          |                 |        |       |            |           |
| VULCAN carbon black                                  | 11.0            | 11.0   | 11.0  | 11.0       | 11.0      |
| MISTRON RCS                                          | 80.0            | 80.0   | 80.0  | 80.0       | 80.0      |
| Above mixed well.                                    |                 |        |       |            |           |
| Properties of the resulting compositions:            |                 |        |       |            |           |
| Brookfield viscosity (cps) at 86° F., #7 spindle @ 100 rpm | 21,200    | 13,600 | 18,000 | 16,000    | 13,600    |
| Gel time, 230° F. (1.5 pbw TBPB /100 pbw of composition) | 12.8/348    | 13.9/328 | 12.9/340 | 13.9/338 | 12/349 |
| Properties on in-mold coating of FRP's with the compositions: | | | | | |
| Adhesion, scalpel:                                   |                 |        |       |            |           |
| FRP I                                                | Fail            | Marg.  | Fail  | Marg./Fail | Fail      |
| FRP III                                              | Fail            | Pass   | Pass  | Pass       | Pass      |
| FRP II                                               | Fail            | Marg.  | Marg. | Fail/Spotty | Marg./Fail |
| Hot Strength (60 secs. cure)                         | Excellent       | Fair/Good | Good | Fair     | Good      |
| Hardness, pencil                                     | 2H              | 2H     | 2H    | F          | 2H        |

EXAMPLE 9

The method of this example was similar to the preceding examples, and the following in-mold coating compositions were prepared:

|                             | Parts By Weight |       |       |       |       |
|-----------------------------|-----------------|-------|-------|-------|-------|
| Ingredient                  | LL              | MM    | NN    | OO    | PP    |
| LP 90                       | 100.0           | 100.0 | 100.0 | 100.0 | 75.0  |
| Hydroxy propyl methacrylate | 30.0            | 30.0  | 30.0  | 35.0  | 35.0  |
| Styrene                     | 25.0            | 25.0  | 25.0  | 30.0  | 40.0  |
| CHEMLINK 600                | —               | 15.0  | 15.0  | 15.0  | 15.0  |
| UVITHANE 782                | 30.0            | —     | 15.0  | 15.0  | 15.0  |

-continued

| Ingredient | Parts By Weight | | | | |
|---|---|---|---|---|---|
| | LL | MM | NN | OO | PP |
| 2% benzoquinone in styrene | 5.0 | 5.0 | 5.0 | 5.0 | 5.0 |
| Above mixed well and then there were added: | | | | | |
| Zinc stearate | 0.9 | 0.9 | 0.9 | 0.9 | 0.9 |
| Calcium stearate | 0.45 | 0.45 | 0.45 | 0.45 | 0.45 |
| Cobalt octoate (12% as Co in mineral oil) | 0.12 | 0.12 | 0.12 | 0.12 | 0.12 |
| Above mixed well and then there was added: | | | | | |
| EPOCRYL 370 | 70.0 | 85.0 | 70.0 | 70.0 | 70.0 |
| Above mixed well and then there were added: | | | | | |
| VULCAN carbon black | 11.0 | 11.0 | 11.0 | 11.0 | 11.0 |
| MISTRON RCS | 80.0 | 80.0 | 80.0 | 80.0 | 80.0 |
| Above mixed well. | | | | | |
| Properties of the resulting compositions: | | | | | |
| Brookfield viscosity (cps) at 86° F., #7 spindle @ 100 rpm | 21,600 | 19,200 | 19,600 | 14,800 | 13,600 |
| Gel time 230° F. (1.5 pbw TBPB/100 pbw composition) | 8.3/ 318 | 10.7/ 322 | 9.6/ 330 | 9.8/ 308 | 9.7/ 312 |
| Properties on in-mold coating of FRP substrates with the compositions: | | | | | |
| Adhesion, scalpel: | | | | | |
| FRP I | Marg. | Marg. | Marg./Pass | Marg. | Marg. |
| FRP III | Pass | Pass | Pass | Pass | — |
| FRP II | Pass | Marg./Pass | Marg./Pass | Marg./Pass | Marg./Pass |
| Hot strength (60 secs. cure) | Fair | Good | Fair | Fair/Good | Fair/Good |
| Hardness, pencil | F | F | F | F | F-H |
| Conductivity | 165+ | 165+ | 165+ | — | — |

EXAMPLE 10

This example illustrates a preferred method for preparation of the in-mold coating composition prior to in-mold coating and curing. The ingredients were mixed in the order as shown below:

| | |
|---|---|
| LP 90 | 75.0 pbw |
| CHEMLINK 600 | 15.0 pbw |
| Hydroxypropyl Methacrylate | 30.0 pbw |
| Styrene | 25.0 pbw |
| 2% Benzoquinone in Styrene | 5.0 pbw |

1. Charge these materials to the reactor and blend.

| | | |
|---|---|---|
| Styrene | 5.0 pbw | 6.47 pbw |
| Zinc Stearate | 0.90 pbw | |
| Calcium Stearate | 0.45 pbw | |
| Cobalt Octoate (12% as Co in mineral oil) | 0.120 pbw | |

2. Pre-blend the above materials and charge to the reactor. After adding the above charge, heat to 44° C. (110° F.) while mixing using a reflux condenser. Once the materials have reached 44° C., remove the heat and set-up to apply cooling water.

| | |
|---|---|
| EPOCRYL 370 (Preheated to 47° C.) | 85.0 pbw |

3. Add the EPOCRYL 370 to the reactor and mix until the material is uniform. During the addition of the EPOCRYL 370, cooling will be required to prevent the temperature from rising. After the EPOCRYL 370 has been added and mixed, cool to 38° C. (100° F.).

| | |
|---|---|
| VULCAN carbon black | 11.0 pbw |

4. Add the carbon black to the reactor and mix for 30 minutes. Hold the temperature at 38° C. (100° F.).

| | |
|---|---|
| Talc (BEAVER WHITE 200) | 80.0 pbw |

5. Add the talc to the reactor and mix for 1 hour while holding the temperature at 38° C. (100° F.). Remove sample.

Brookfield Viscosity (cps) 86° F., #7 Spindle @ 100 rpm, 10,000–14,000.

6. Check the gel time. If below 8 minutes, add 1 pbw of 2% benzoquinone in styrene and mix for 30 minutes. Recheck the gel time. Repeat the above procedure until the gel time is between 13 to 14 minutes.

| | |
|---|---|
| Gel time,* 230° F. | 14–16 minutes |

*1.0 pbw of TBPB/100 pbw total composition. When making up material for checking the gel time, weigh out 100.0 gms total composition and add 1.00 gm of TBPB and mix thoroughly before running gel test.

7. Add 1 additional part of 2% benzoquinone in styrene. Subtract the total number of the pbw of 2% benzoquinone in styrene additions made from the number 5 and add the difference as styrene. Mix for 30 minutes, degas for 15 minutes and filter through a 60 mesh screen. Store at 70° F. pbw—parts by weight.

Notes For The Examples

LP-90—BAKELITE LP-90-40% by weight of polyvinyl acetate in styrene, viscosity of 1,800 centipoises at 25° C. (Model LVT Brookfield viscometer #4 spindle at 60 rpm), specific gravity 20/20° C. ($H_2O = 1$) of 1.008 and solidification temperature of 5° C. Union Carbide Corp.

UVITHANE 783, a polymerizable urethane based material or oligomer, a diacrylate terminated polyesterurethane prepolymer. A viscous liquid (Kg/l 1.3 at 25° C.) having a viscosity at 49° C. of 600–2000 poise and at 82° C. of 50–110 poise, having an unsaturation (equiv./100 grams) of 0.17–0.205 and having an isocyanate content (%) of 0.3 max. Thiokol/Chemical Division, Thiokol Corporation.

CHEMLINK 600 or CL 600-Polyoxyethylene glycol 600 dimethacrylate. Molecular weight of about 770. $C_{36}H_{66}O_{17}$. The Ware Chemical Corp.

VULCAN—XC-72R. N472. Conductive furnace carbon black. Cabot Corp.

Talc—hydrous magnesium silicate.

TBPB—tertiary butyl perbenzoate.

EPOCRYL 370—Non-volatile diacrylate ester of a liquid Bisphenol A epoxy resin having a viscosity, poise, 25° C. (100% resin) of 9,000; and acidity eq./100 G of 0.007; an epoxide eq./100 G of 0.02; a Gardner color of 4; a weight/volume, lb/U.S. Gal, of 9.99; a flash point, °C.>204 and a viscosity, Gardner, 25° C. (80% w resin in xylene) of V-Y. Shell Chemical Co.

CHEMPOL 4825—(19-4825) Solvent free epoxy acrylate resin which contains active acrylic unsaturation on the polymer molecule. It has an acid number of 3-10; a color of 1-4; a viscosity, centipoise, of 4000-6000 at 140° F. and 1400-1800 at 160° F. and a weight per gallon of 9.8-10.0 lbs. It may contain up to 2% by weight of free acrylic acid. Freeman Chemical Corp.

UMIVER 580—A polyethylenically unsaturated liquid oligomer having a high reactivity in free radical polymerization. An amber colored liquid at room temperature having a mild characteristic odor. It has a viscosity (Gardner-Holdt) $Z_6$-$Z_7$ (200-500 poises), a color (Gardner-Holdt) of 3 max., a weight of 9.6±0.1 lbs./U.S. gallon and a flash point (closed cup) of 210° F. (approx.). Polychrome Corporation.

ATLAC 382 E—It is a Bisphenol A—polyester resin. ICI Americas Inc.

UVITHANE 893—A polymerizable urethane oligomer, a viscous liquid. It has a color, APHA, of 110 max.; a mild odor; a weight of 10 lbs/gal at 77° F.; viscosity poises of 900-2200 at 120° F., 80-180 at 160° F. and 30-80 at 180° F.; an unsaturation equiv/100 g. of 0.150-0.175 and an isocyanate content of 0.2% max. Thiokol Corporation.

Polyester—A polyester made by the copolymerization of propylene oxide, ethylene oxide, maleic anhydride, fumaric acid and phthalic anhydride using a double metal cyanide catalyst. It has been isomerized, is OH terminated and has a molecular weight of about 1200.

UVIMER 530—A polyethylenically unsaturated liquid oligomer with extremely high reactivity in free radical polymerization. It has a viscosity (Gardner-Holdt) $Z_7$-$Z_8$ (375-600 poises); a color (Gardner-Holdt) of 5 max.; a weight of 9.8±0.05 lbs. per U.S. gallon and a flash point (closed cup) of 210° F. (approx.). Polychrome Corporation.

NUPOL 46-8012—A mixture of 70% acrylate terminated polymer, 28% styrene and 2% hydroxyethyl methacrylate. Freeman Chemical Corp.

MISTRON RCS—Talc. Cyprus Industrial Chems.

UVITHANE 782—Acrylated urethane oligomer. Low melting solid, APHA color of 50 max., mild odor, lbs./gal at 77° F. (25° C.) (kg/l) of 10.2 (1.2), Viscosity in poises at 120° F. (49° C.) of 800-1600, @ 160° F. (71° C.) of 200-350 and @ 180° F. (82° C.) of 85-165, unsaturation equivalent/100 gms. of 0.04-0.05 and an isocyanate content % of 0.3 max. Thiokol/Chemical Division.

What is claimed is:

1. A composition useful as a thermosetting coating composition comprising
   (a) 100 parts by weight of at least one polymerizable epoxy based oligomer having at least two acrylate groups and a weight average molecular weight of from about 500 to 1,500,
   (b) from about 80 to 160 parts by weight of at least one copolymerizable ethylenically unsaturated monomer selected from the group consisting of styrene, alpha methyl styrene, vinyl toluene, t-butyl styrene, chlorostyrene, methyl methacrylate, diallyl phthalate (with styrene or methyl methacrylate), triallyl cyanurate, triallyl isocyanurate, divinyl benzene and methyl acrylate,
   (c) from about 10 to 120 parts by weight of at least one copolymerizable monoethylenically unsaturated compound having a —CO— group and a —$NH_2$, —NH— and/or —OH group,
   (d) from about 20 to 90 parts by weight of polyvinyl acetate,
   (e) from about 0.2 to 5 parts by weight of at least one zinc salt of a fatty acid having at least 10 carbon atoms,
   (f) from about 0.01 to 1.0 part by weight of at least one accelerator for a peroxide initiator,
   (g) from about 5 to 30 parts by weight of conductive carbon black,
   (h) from about 50 to 155 parts by weight of a filler and
   (i) from about 5 to 120 parts by weight of a copolymerizable or cocurable diacrylate compound having a weight average molecular weight of from about 250 to 5,000 and being selected from the group consisting of
      (I) at least one polyoxyalkylene glycol oligomer having two acrylate groups and
      (II) at least one polyurethane based oligomer having two acrylate groups and mixtures of (I) and (II).

2. A composition according to claim 1 containing additionally at least one organic free radical peroxide initiator in an amount of up to about 5% by weight based on the weight of the polymerizable ethylenically unsaturated materials.

3. A composition according to claim 1 where (H) comprises talc.

4. A composition according to claim 3 containing additionally at least one organic free radical peroxide initiator in an amount of up to about 5% by weight based on the weight of the polymerizable ethylenically unsaturated materials.

5. A composition according to claim 1 containing additionally (j) at least one calcium salt of a fatty acid having at least 10 carbon atoms in an amount of from about 0.2 to 5 parts by weight.

6. A composition according to claim 5 containing additionally at least one organic free radical peroxide initiator in an amount of up to about 5% by weight based on the weight of the polymerizable ethylenically unsaturated materials.

7. A composition according to claim 1 containing additionally (J) at least one calcium salt of a fatty acid having at least 10 carbon atoms in an amount of from about 0.2 to 5 parts by weight and where (h) comprises talc.

8. A composition according to claim 7 containing additionally at least one organic free radical peroxide initiator in an amount of up to about 5% by weight based on the weight of the polymerizable ethylenically unsaturated materials.

9. A composition according to claim 1 where (a) is a diacrylate ester of a liquid Bisphenol A epoxy resin,
(b) is styrene,
(c) is hydroxypropyl methacrylate,
(e) is zinc stearate,
(f) is cobalt octoate,
(h) is talc and
(i) is polyoxyethylene glycol dimethacrylate having a molecular weight of about 770.

* * * * *